D. A. DICKEY.
HUB BUSHING FOR MOLDING COMPOSITE PROPELLERS.
APPLICATION FILED FEB. 15, 1919.
1,363,723.
Patented Dec. 28, 1920.
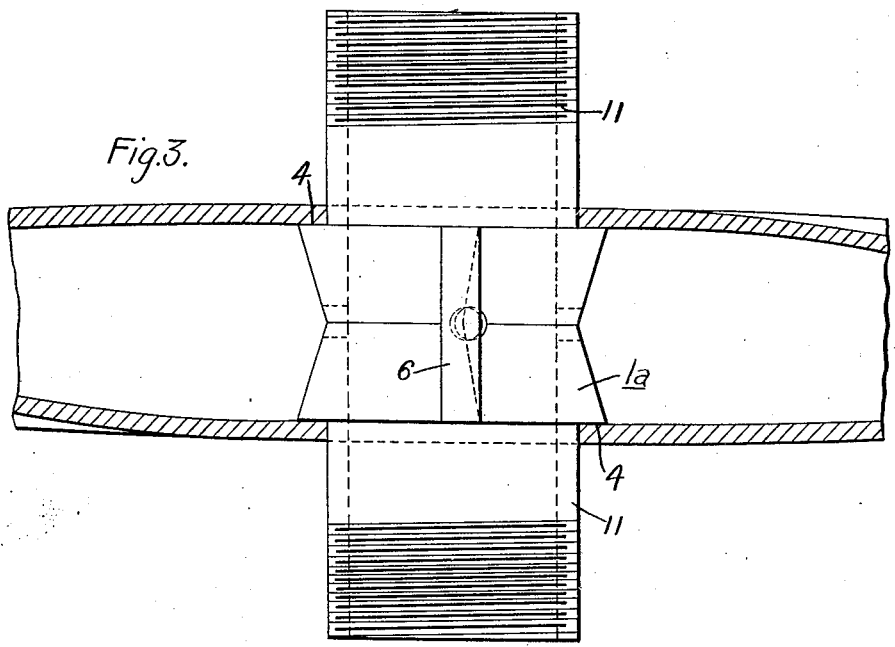
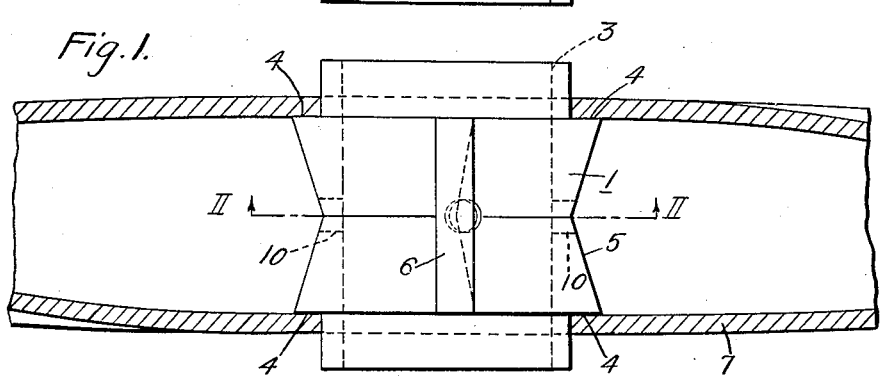
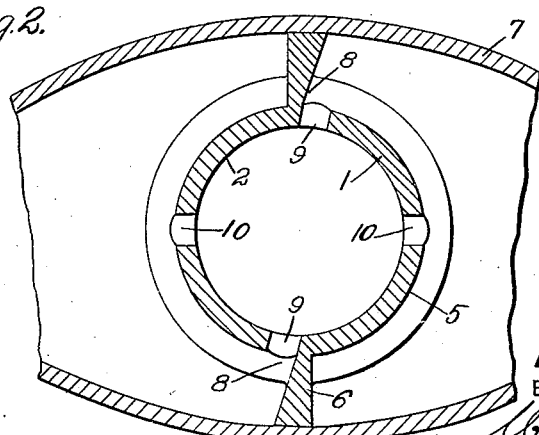
WITNESSES:
J. A. Helsel.
W. H. Woodman.
INVENTOR
Daniel A. Dickey.
BY
Wesley G. Carr
ATTORNEY

UNITED STATES PATENT OFFICE.

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

HUB-BUSHING FOR MOLDING COMPOSITE PROPELLERS.

1,363,723.  Specification of Letters Patent.  Patented Dec. 28, 1920.

Application filed February 15, 1919. Serial No. 277,241.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Hub-Bushings for Molding Composite Propellers, of which the following is a specification.

My invention relates to apparatus for use in molding bodies of fibrous material, impregnated with a suitable binder which may be hardened by simultaneous application of heat and pressure and more particularly in the molding of hollow bodies.

In an application filed by Louis T. Frederick, December 30, 1918, Serial No. 268,952, and assigned to the Westinghouse Electric & Manufacturing Company, is disclosed a method of molding hollow bodies, and more particularly, propellers, by assembling suitably impregnated, fibrous, sheet material about a propeller-shaped core, of readily fusible material, preferably a metallic alloy, disposing the assembled body and its core in a mold and compacting the body and hardening its binder by application of heat sufficient to fuse the core and by applying pressure to the fused core.

My present invention relates to a hub-bushing which may be molded or cast into the hub portion of the core and to which the propeller body assembled about the core may be molded.

One of the objects of my invention is to provide a bushing of this sort and of such character as to facilitate the molding operation and which, subsequently, may constitute a permanent bushing for the hub of the propeller.

Another object of my invention resides in forming a hub-bushing in such manner as to permit application of fluid pressure to the core while it is in a fused condition.

One of the most important objects of my invention consists in so forming the hub-bushing that, after the propeller has been molded or cured, its core, in a fused state, may be drained from the propeller, easily and completely, through the bushing, so that there is no necessity of drilling, cutting or otherwise mutilating the material of the propeller to remove the core.

Still another object of my invention consists in forming the hub-bushing so as to provide a good and strong engagement between it and the finished propeller.

With these and other objects in view, my invention will be more fully described, illustrated in the drawings, in the several views of which corresponding numerals indicate like parts, and then particularly pointed out in the claims.

Figure 1 is an elevation of my propeller-hub-bushing, a portion of a propeller mounted thereon being shown in longitudinal section; Fig. 2 is a transverse, sectional view of the structure shown in Fig. 1, taken on substantially the line II—II thereof, and Fig. 3 is a view, corresponding to Fig. 1, showing a slightly modified construction.

My improved hub-bushing, which may be formed of any suitable metal, such as steel, comprises a body 1 of substantially cylindrical shape provided with an axial spindle-receiving bore 2 which may be subsequently employed to receive a hub of suitable character. The bore 2, at its ends, is preferably formed with frusto-conical seats 3 and, adjacent its ends, it is reduced to provide annular shoulders or seats 4. Furthermore, the periphery of the body portion of the bushing is preferably of double frusto-conical form to provide a groove or channel 5, the sides of which extend to the ends of such body portion. The bushing is provided externally with oppositely disposed radially extending wings 6, as shown in Fig. 2 of the drawings, the outer edges of which are adapted to abut against the walls of a hollow propeller 7 so that the bushing, as a whole, constitutes a partition between the blades of the propeller to prevent flow of fused core material from either blade to the other.

As will be noted, the face of one wing, which is directed toward one end of the propeller, and the face of the other wing, which is directed toward the opposite end of the propeller, are outwardly inclined toward such propeller ends to coöperate with adjacent portions of the groove 5 in forming pockets 8, and the body of the bushing is provided with correspondingly inclined passages 9, the outer ends of which terminate at the bases of the pockets 8. The body of the bushing is further provided with radial passages 10 disposed intermediate the passages 9 and opening into the base of the channel 5.

When employing the above described apparatus, the bushing may be embedded in a core or readily fusible material, such as a low-melting-point metallic alloy, in such position that, when a propeller has been formed about the core, the bushing may receive a hub for the propeller. Care should be taken that the wings of the bushing occupy the positions indicated in Fig. 2 in order that they may effectively serve their purpose.

With the core and bushing thus assembled, a propeller body may be formed about the core in any suitable manner, to engage the annular seats 4 at the end of the bushing so that, when the propeller is finished, the bushing will be securely locked in place. The propeller body may be formed by superimposing layers of suitable fibrous sheet material, such as paper or duck, impregnated with any desirable binder, such as a phenolic condensation product, about the core, one method of doing this being fully disclosed in the previously-referred-to application of Louis T. Frederick.

When the propeller is thus assembled about the core and the hub-bushing, it may be disposed in a suitable mold and heated to fuse the core, and any desired means may be employed for transmitting pressure to the core through the passages in the bushing. One means which may be employed is fully disclosed in a copending application filed by me Feb. 15, 1919, Serial No. 277,242, which discloses a temporary spindle to be snugly fitted within the bore of the bushing so as to seal either the passages 9 or the passages 10 of the bushing and provided with a passage way communicating with the other passages of the bushing so that a fused alloy, such as that constituting the core, may be forced through the spindle against the core.

Another method by which pressure may be applied to the core during molding of the propeller, involves the use of a slightly modified form of hub-bushing-construction, as shown in Fig. 3, in which the bushing body 1ª is provided with tubular, exteriorly threaded extensions 11 adapted to receive pipe connections, plugs, caps and like fittings so that a pressure-applying fluid may be introduced into the bushing.

After the propeller has been cured, it may be removed from the mold, and the core, while still in its fused condition, may be drained from the propeller by tilting it in such manner as to cause the fused metal contained in one blade to run through one of the passages 9 into a suitable receptacle and by then tilting it in the opposite direction to cause the metal in the opposite blade to run through the other passage 9. Because of the pockets 8, formed by the inclined faces of the wings in conjunction with the annular groove or channel 5, it is possible to completely drain all of the fused metal from the propeller, while the wings prevent the metal from running from end to end of the propeller which, of course, would render proper draining of the core impossible.

When the fused core has been completely drained out, a hub of suitable character may be applied. If the form of bushing shown in Fig. 3 is employed, the threaded tubular extensions may be cut off after the propeller is cured.

It should be noted that the annular seats or shoulders 4 of the bushing constitute bearing surfaces across the direction of the pressing force of a press, which may be employed to close the mold, so that the direct force of the press is perpendicular to these surfaces, and a good, closely sealed joint between the material of the propeller and the bushing is assured. To obtain a firmer locking action between the bushing and the propeller, the surfaces of these seats may be knurled or roughened, if desired.

Obviously, the bushing may be provided with spokes, spines, pockets or other means for more rigidly holding the bushing in the fusible core during the assembling of the propeller body about it, if found advisable. These anchoring means should, however, be of such character as to, in no way, interfere with the draining off of the fused core after the propeller is molded and should be so arranged as not to disturb the balance of the bushing.

Because of the minor changes of construction thus indicated, it will be understood that no limitations are to be imposed upon my invention other than those indicated in the appended claims.

I claim as my invention:

1. A hub-bushing for hollow, molded propellers comprising a substantially cylindrical body formed with a spindle-receiving bore and reduced portions providing annular seats into which the material of the propeller may be molded.

2. A hub-bushing for hollow, molded propellers comprising a substantially cylindrical body formed with a spindle-receiving bore, the body being reduced adjacent its ends to provide annular seats into which the material of a propeller may be molded, and opposed radial wings projecting from the body and proportioned to engage the inner surface of a propeller into which the hub is molded, whereby the hub and its wings may constitute a closure between the blade portions of the propeller.

3. A hub-bushing for hollow propellers molded by employment of a fusible core comprising a substantially cylindrical body member adapted to be disposed between sections of the core and to be molded into a propeller, the body member being formed with a spindle-receiving bore and having oppositely disposed radially projecting wings adapted to engage the inner surface of the propeller, to provide a partition between the blades thereof, and with passages communicating between the spindle-receiving bore and the blade portions of the propeller.

4. A hub-bushing for hollow propellers molded by employment of a fusible core, comprising a substantially cylindrical body member adapted to be disposed between sections of the core and to be molded into a propeller, the body member being formed with a spindle-receiving bore and having oppositely disposed radially projecting wings adapted to engage the inner surface of the propeller to provide a partition between the blades thereof and passages communicating between the spindle-receiving bore and the blade portions of the propeller, one passage communicating with each blade portion of the propeller and opening into the blade portion of the propeller adjacent one face of a wing and at an inclination toward the end of the blade, the adjacent faces of the wings being correspondingly inclined, whereby pockets are provided from the bases of which the passages lead.

5. A hub-bushing for hollow propellers, molded by use of a fusible core, comprising a substantially cylindrical body having a spindle-receiving bore and reduced ends forming annular seats, the body being formed with a circumferential groove or channel and with a pair of oppositely disposed radially extending wings adapted to engage against the inner surface of a propeller, whereby the hub and wings may form a partition between the blade portions of the propeller, one face of one wing and the opposite face of the other wing being oppositely inclined to form, in conjunction with the groove, pockets, and the body being formed with passages, between the pockets and the spindle-receiving bore, disposed at substantially the same inclination as the pocket-forming faces of the wings.

In testimony whereof, I have hereunto subscribed my name this 28th day of Jan., 1919.

DANIEL ADAM DICKEY.